United States Patent Office 3,733,255
Patented May 15, 1973

3,733,255
CONVERSION OF MUNICIPAL REFUSE, SEWAGE SLUDGE AND OTHER WASTES TO HEAVY OIL OR BITUMEN
Herbert R. Appell, Monroeville, Pa., and John S. Tosh, Alexandria, Va., assignors to the United States of America as represented by the Secretary of Interior
No Drawing. Filed Oct. 30, 1970, Ser. No. 85,704
Int. Cl. C10b 57/00
U.S. Cl. 201—25
7 Claims

ABSTRACT OF THE DISCLOSURE

Municipal sewage sludge, refuse and other wastes are converted to heavy oil or bitumen by heating under pressure, in the absence of air, in the presence of carbon monoxide and water.

---

This invention relates to the conversion of solid municipal wastes and other wastes to heavy oil or bitumen.

In view of the increasing amount of municipal refuse and sewage produced by the expanding population, refuse and sewage sludge disposal is rapidly becoming a national problem of major importance. The present systems, such as land filling and incineration, for handling such solid wastes cannot be employed indefinitely. Incineration produces no useful by-products and increasingly pollutes the air. Disposal by landfill is becoming increasingly difficult and costly as suitable land becomes scarce. Further, leaching or filled areas may cause stream pollution. Thus, there is a growing need to develop other systems to dispose or otherwise handle such solid wastes.

We have now discovered that such wasts can be converted to a heavy oil or semi-solid, bitumen-like material by heating it under pressure, in the absence of air, in the presence of $H_2O$ and carbon monoxide. The conversion product can be refined in the prior art manner to produce gasoline and other valuable hydrocarbons. In some instances the heavy oil can be directly employed as fuel oil.

It is therefore an object of the present invention to convert solid wasts such as municipal sewage sludge or refuse to a useful material.

Another object is to convert such wastes to hydrocarbons.

Other objects and advantages will be obvious from the following more detailed description of the invention.

As used throughout the specification and claims, the phrase "municipal sewage sludge" means the sludge material removed from sewage in a primary municipal sewage treatment system, while the phrase "municipal refuse" refers to the garbage, trash, etc. collected from homes, businesses, institutions, etc. in a community, which material is commingled in the collection process, and dumped in designated refuse areas in such a commingled state.

In the practice of the invention, an apparatus such as an autoclave is employed to heat the wastes in the absence of air. Heating temperatures range from about 250° C. to 450° C., while the pressure is about 1,000 p.s.i.g. to 7,000 p.s.i.g. Preferably, the operating temperatures and pressures are about 250° C. to 400° C. and about 1,500 to 5,000 p.s.i.g., respectively.

For purposes of convenience, siliceous objects (glass, ceramics, stones) and metallic objects can be removed from the wastes prior to the reaction so as to reduce the equipment-clogging burden in a continuous production system, and so as to help alleviate problems of separation of oil from residue after the conversion.

Carbon monoxide is added to the reaction zone in an amount so that its partial pressure in the zone is initially at least 10 percent of the total pressure, preferably about 30 percent.

As to the water content, at the lower operating temperatures (250°–300° C.) it is essential that enough water be present in the reaction zone so that about 2 to 5 ml. of water per gram of dry waste will remain in a liquid state during the reaction. At the higher temperatures (above 300° C.) it is not necessary for any water to be present in a liquid state, and the water is simply added to the zone in an amount of about 0.25 to 2.0 ml. or more of water per gram of dry waste.

With further regard to lower operating temperatures (250°–300° C.), the reaction is too slow and incomplete for practical purposes unless the wastes contain at least 0.2%, preefrably about 1.0 to 5.0%, on a dry basis, of an alkali or alkaline earth oxide, hydroxide, carbonate, bicarbonate or formate. These compounds exhibit a catalytic effect in the conversion, and are naturally contained in many wastes in the requisite amount. Otherwise, they can be added to the autoclave mixture. Ammonium hydroxide and strongly basic nitrogen compounds also show similar catalytic activity, except that these compounds undesirably increase the amount of nitrogen in the heavy oil or bitumen product.

Contact time varies from a few minutes to an hour or more. Usually the conversion will be completed in about 20–30 minutes. The solid and liquid products of conversion consist of (a) a heavy oil (at the higher temperatures) or semi-solid bitumen (at the lower temperatures), (b) solid carbonaceous residue, and (c) an aqueous phase. To separate the heavy oil or bitumen-like product from the other reaction products, solvent extraction can be employed with, for example, benzene or acetone, which solvent is then stripped off from the product. In a large scale operation, distillation can be employed as the separation means. After separation, the oil or bitumen can be upgraded in the prior art manner to high grade fuel oil or gasoline, or in some instances the heavy oil can be employed directly as fuel oil. Further, with regard to the municipal refuse as presently found in our country, the heavy oil product will always be very low in sulfur content (approximately 0.1 percent). As such it can be employed as a blending agent to lower the sulfur content of high sulfur petroleum fuel oils.

At the lower operating temperatures (250°–300° C.), it has been discovered that the aqueous phase of the reaction product contains considerable amounts of an intermediate reaction product in solution which, if subsequently treated under the reaction conditions of the present invention, will result in the production of more heavy oil or bitumen. Such additional treatment can be accomplished by recycle of the aqueous phase to the primary reaction zone to be heated therein with additional wastes, or by separate treatment of this phase in a second autoclave or other enclosure.

Carbonaceous residue reamining after separation of aqueous solution and product oil or bitumen usually contains 10 to 50% ash, and may be used as, for example, a low grade fuel.

In tests to date as much as 40% (dry basis) or more of the solid wastes have been converted to heavy oil or bitumen product. This is equivalent to more than two barrels of oil per ton of dry, ash-free waste material. Infrared and mass spectrometric analysis shows this product essentially to be paraffinic and cycloparaffinic in nature. Oxygen (usually 10 to 20% of the product) is present largely as carbonyl groups, but a significant number of carboxylic acids are also present. There is a small aromatic content in the product at the higher operating temperatures but none appears at the lower temperatures.

It is believed that the oil or bitumen product of the present invention is largely derived from the carbohydrate fraction of the solid wastes. In this regard the carbohydrate content of municipal refuse will generally range from about 60 to 80 weight percent, dry basis. These compounds are found in such materials as food wastes, paper products, wood, textiles and grass. The remainder of the refuse generally is made up of siliceous objects (glass, ceramics, stones), metallic objects, dirt, fats (derived from palmitic and stearic acids), rubber, proteinaceous matter in grass, leather, and food wastes, plastic films and objects composed of polystyrene, polyethylene and vinyl, textiles composed of non-carbohydrate substances. As for the composition of municipal sewage, its carbohydrate content generally is about 70 to 85%, dry basis, while the remainder is largely inorganic.

One theory advanced in explanation of the present invention is that, in the presence of carbon monoxide and steam under pressure, an internal rearrangement is promoted within the various carbohydrate compounds present in the wastes. For reasons which are not completely understood at present, the presence of carbon monoxide decreases the rate of dehydration and increases the rate of decarboxylation of these compounds. Despite the presence of large amounts of the above-enumerated non-carbohydrate substances in municipal wastes, the mechanism of carbohydrate conversion does not appear to be hindered. However, if there is a considerable content (i.e., more than 10%) of plastic materials such as polyethylene or polystyrene, the preferred operating temperature is about 400° C.–425° C. rather than 250° C.–400° C.

Some of the carbon monoxide in the reaction zone enters into the water-gas shift reaction if the operating temperature is 300° C. or more, and the hydrogen formed thereby is believed to hydrogenate carbohydrate and other decomposition products, although the major contribution of the carbohydrates to heavy oil or bitumen production is believed to occur from internal molecular rearrangement. With further regard to hydrogenation, in comparative tests the hydrogen derived from the water-gas shift reaction has unexpectedly exhibited more hydrogeneration activity than equivalent amounts of hydrogen incorporated as a starting material in place of carbon monoxide.

The following examples illustrate the process of the present invention:

EXAMPLE 1

300 grams of sewage sludge (260 grams water, 40 grams dry matter) from a Chicago Sanitary District was placed in a 500 ml. autoclave and heated for 1 hour at 250 C., 500 p.s.i.g. initial carbon monoxide pressure, 1500 p.s.i.g. operating pressure. 24.5% of the dry matter charged to the autoclave was converted to a heavy oil having the following analysis (weight percent): C, 77.0; H, 10.7; N, 2.80; S, 0.64; O, 8.8.

EXAMPLE 2

Refuse was obtained from a waste treatment facility near Altoona, Pa. Refuse arriving at this plant is separated by the house-holders in the area into a metallic object-free and siliceous object-free fraction to be composted at the plant. Once there, it is moistened and shredded prior to bacterial digestion. 50 grams of the shredded intermediate plan product (42 grams of dry solids) were placed in a 500 ml. autoclave. It was heated for 20 minutes at 380° C., 5000 p.s.i.g. operating pressure; 1500 p.s.i.g. initial CO pressure. 8.7 grams of oil was obtained having the following analysis (weight percent): C, 79.6; H, 9.5; N, 1.9; S, 0.13; O, 8.8.

EXAMPLE 3

100 grams of the same refuse as in Example 2 was mixed with 100 grams of water and placed in a 500 ml. autoclave. 1 gram of sodium bicarbonate was also added. The mixture was then heated at 250° C. for 60 minutes, 1500 p.s.i.g. operating pressure, 500 p.s.i.g. initial CO pressure. 37 percent of the dry matter charged to the autoclave was converted to a semi-solid bitumen-like material having the following analysis (weight percent): C, 71.7; H, 7.3; N, 2.0; S, 0.15; O, 18.7.

Other carbohydrate-containing wastes have also been converted to oil or bitumen by the process of the present invention. These include agricultural and farming wastes such as corn stalks and cow manure.

What is claimed is:

1. A process for producing heavy oil or semi-solid bitumen-like material from wastes selected from the group consisting of municipal refuse, sewage sludge, and carbohydrate-containing agricultural and farming waste materials comprising heating said wastes in the absence of air, at a temperature of about 250° C. to 450° C., in the presence of carbon monoxide and water, and an operating pressure of about 1,000 to 7,000 p.s.i.g., wherein said carbon monoxide is added in an amount so that its partial pressure is initially at least 10% of said operating pressure, wherein said water is present in an amount of at least 0.25 ml. per gram of dry waste when said temperature is above 300° C., wherein said water is present in amount so that about 2 to 5 ml. of water per gram of dry wastes remain in the liquid state during said heating when said temperature is 250°–300° C., to thereby produce said heavy oil or bitumen-like material.

2. The process of claim 1 wherein said wastes include about 60 to 80%, dry basis, of carbohydrate compounds.

3. The process of claim 1 wherein said carbon monoxide is added in an amount so that its partial pressure is initially about 30% of said operating pressure.

4. The process of claim 1 wherein metallic objects and siliceous objects are removed from said wastes prior to said heating.

5. The process of claim 2 wherein metallic objects and siliceous objects are removed from said wastes prior to said heating.

6. The process of claim 1 wherein said pressure is about 1500 to 5000 p.s.i.g.

7. The process of claim 1 wherein said heating period is at least 20 minutes.

References Cited

UNITED STATES PATENTS

| | | | |
|---|---|---|---|
| 1,445,423 | 2/1923 | Ulke | 208—8 |
| 1,391,664 | 9/1921 | Bergius | 208—8 |
| 1,251,954 | 1/1918 | Bergius et al. | 208—8 |
| 1,781,934 | 11/1930 | Snyder | 208—8 |

OTHER REFERENCES

Herbert R. Appell, Irving Weuder and Ronald D. Miller: Bus. Mines Techn. Prog. Rep. 25—Solid Waste Program, May 1970.

DELBERT E. GANTZ, Primary Examiner

V. O'KEEFE, Assistant Examiner

U.S. Cl. X.R.

48—209; 201—2.5; 208—39